United States Patent
Weiss

(10) Patent No.: US 9,643,618 B2
(45) Date of Patent: May 9, 2017

(54) SENSOR SYSTEM FOR A VEHICLE AND OPERATING METHOD FOR A SENSOR SYSTEM IN A VEHICLE

(75) Inventor: Timo Weiss, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 14/240,972

(22) PCT Filed: Jul. 5, 2012

(86) PCT No.: PCT/EP2012/063086
§ 371 (c)(1),
(2), (4) Date: Aug. 14, 2014

(87) PCT Pub. No.: WO2013/029843
PCT Pub. Date: Mar. 7, 2013

(65) Prior Publication Data
US 2014/0379165 A1 Dec. 25, 2014

(30) Foreign Application Priority Data
Sep. 1, 2011 (DE) .......................... 10 2011 081 947

(51) Int. Cl.
*B60W 50/00* (2006.01)
*H04L 1/16* (2006.01)
(Continued)

(52) U.S. Cl.
CPC ............ *B60W 50/00* (2013.01); *G01D 21/00* (2013.01); *G05B 21/02* (2013.01); *H04L 1/0001* (2013.01);
(Continued)

(58) Field of Classification Search
USPC ............................................................ 701/1
See application file for complete search history.

(56) References Cited

U.S. PATENT DOCUMENTS 4,845,649 A * 7/1989 Eckardt ................ B60C 23/043
340/442
6,664,900 B1 * 12/2003 Motz ...................... G01D 18/00
327/58

(Continued)

FOREIGN PATENT DOCUMENTS

CN 101135581 A 3/2008
CN 101370675 A 2/2009
(Continued)

OTHER PUBLICATIONS

International Search Report for PCT/EP2012/063086, dated Nov. 12, 2012.
(Continued)

*Primary Examiner* — Shelley Chen

(57) ABSTRACT

A sensor system for a vehicle includes: at least one sensor unit; and one evaluation and control unit transmitting a synchronization signal via a communication connection to the sensor unit. The sensor unit transmits a sensor signal representing the measured variable via the communication connection to the evaluation and control unit. The evaluation and control unit ascertains an instantaneous signal quality of the received sensor signal and transmits a piece of information about the ascertained instantaneous signal quality to the sensor unit. The sensor unit predefines a modulation amplitude for the transmission of the sensor signal as a function of the ascertained instantaneous signal quality.

22 Claims, 1 Drawing Sheet

(51) Int. Cl.
H04L 1/20 (2006.01)
G05B 21/02 (2006.01)
H04L 1/00 (2006.01)
G01D 21/00 (2006.01)
H04L 12/40 (2006.01)

(52) U.S. Cl.
CPC .............. H04L 1/0026 (2013.01); H04L 1/16 (2013.01); H04L 1/20 (2013.01); H04L 12/40013 (2013.01)

(56) References Cited

U.S. PATENT DOCUMENTS

| | | | | |
|---|---|---|---|---|
| 2002/0011928 | A1* | 1/2002 | Williams | B60Q 9/006 340/436 |
| 2002/0026824 | A1* | 3/2002 | Frost | B60Q 9/006 73/84 |
| 2008/0075463 | A1* | 3/2008 | Nakamoto | H04B 10/2557 398/79 |
| 2009/0235140 | A1* | 9/2009 | Yue | H04L 1/0003 714/751 |
| 2009/0299675 | A1* | 12/2009 | Isaacson | A61B 5/14551 702/104 |
| 2009/0319855 | A1* | 12/2009 | Yue | H04L 1/0003 714/751 |
| 2010/0033316 | A1* | 2/2010 | Oda | B60C 23/0408 340/447 |
| 2011/0037985 | A1* | 2/2011 | Qiu | G01C 19/72 356/461 |
| 2013/0027038 | A1* | 1/2013 | Heismann | G01R 33/56 324/309 |

FOREIGN PATENT DOCUMENTS

| | | | |
|---|---|---|---|
| DE | 34 46 248 | 6/1986 | |
| DE | EP 1098174 A1 * | 5/2001 | ............ G01D 18/00 |
| DE | 10 2009 046 450 | 5/2011 | |
| EP | 1 098 174 | 5/2001 | |
| JP | 2003046436 A | 2/2003 | |
| JP | 2003198460 A | 7/2003 | |
| JP | 2008087704 A * | 4/2008 | |
| WO | WO 02/06852 | 1/2002 | |

OTHER PUBLICATIONS

PS15 Specification V1.3; PS15 Peripheral Sensor Interface, PS15, Jun. 6, 2008, 1-48.

* cited by examiner

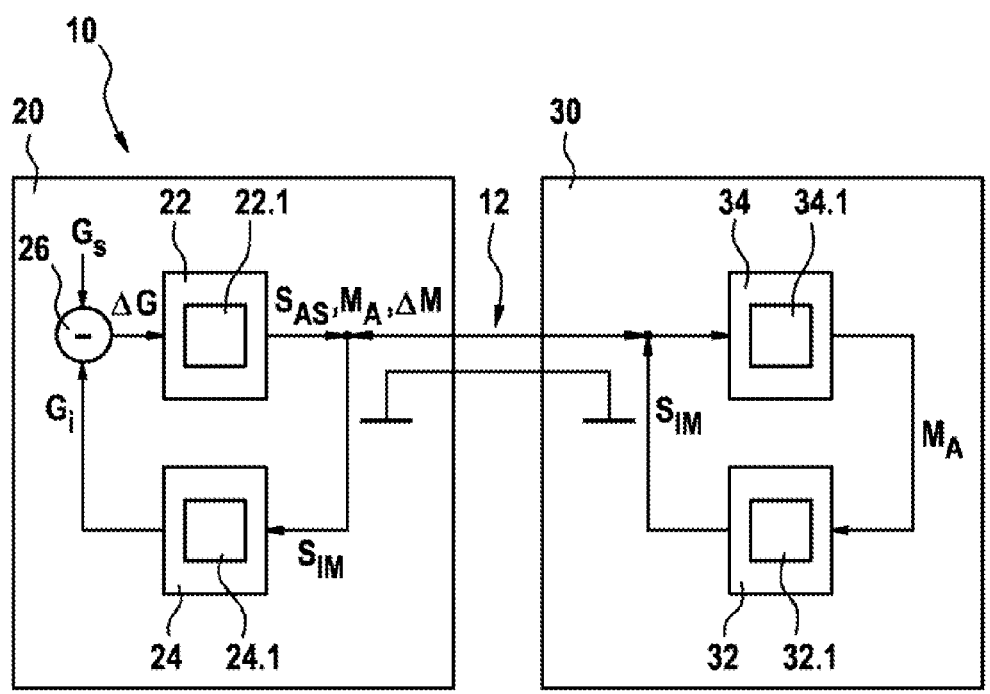

SENSOR SYSTEM FOR A VEHICLE AND OPERATING METHOD FOR A SENSOR SYSTEM IN A VEHICLE

BACKGROUND OF THE INVENTION

1. Field of the Invention

The present invention is directed to a sensor system for a vehicle and to an operating method for a sensor system in a vehicle.

2. Description of the Related Art

Peripheral sensor units in occupant protection systems generally use current interfaces (e.g., PAS4-IF, PSI5 or the like) for transmitting sensor data to an evaluation and control unit, such as a central control unit, for example. In current interfaces of the latest generation (e.g., PSI5 v1.3, Pegasus or the like), the data transmission is carried out clock-synchronously with the evaluation and control unit.

A working clock signal is generated by the evaluation and control unit for this purpose, which is supplied to the peripheral sensor units to signal the start of a new data frame. The communication from the sensor unit in the direction of the evaluation and control unit is then carried out by modulation of the consumed current. The modulation amplitude of the data signal is fixedly predefined.

Published German patent application document DE 10 2009 046 450 A1 describes a sensor system having at least one sensor and one evaluation unit, and a method for operating a sensor system. The described evaluation unit is supplied a sensor signal of the at least one sensor which represents the measured variable. A modulator is provided, with the aid of which the signal of the sensor is modulated during the measurement with a periodic test signal which is independent of the sensor signal.

BRIEF DESCRIPTION OF THE INVENTION

The sensor system according to the present invention for a vehicle and the operating method for a sensor system in a vehicle have the advantage over the related art that the modulation amplitude may be adapted to the instantaneous transmission properties such as failure rate, signal to noise ratio, interference power and the like in the frequency band of the communication. In this way the modulation amplitude may be reduced, for example, in order to reduce the noise radiation of the at least one sensor unit to a minimally necessary degree if the signal quality of the received sensor signal is more than sufficient. In addition, the power consumption in the evaluation and control unit may be reduced.

Specific embodiments of the present invention preferably form a control loop, whose controlled variable is the modulation amplitude of the at least one sensor unit. A sufficient signal quality of the sensor signal transmitted via a communication connection is predefined as the setpoint variable. When the actual variable of the instantaneous signal quality is lower than the predefined setpoint variable of the signal quality, the modulation amplitude is increased; when the actual variable is higher than the setpoint variable, the modulation amplitude is reduced. The value for the modulation amplitude to be set may be ascertained in the transmitter unit of the evaluation and control unit, for example, and may then be transmitted to the at least one sensor unit with the aid of a corresponding modulation of the synchronization signal. As an alternative, a receiver unit in the at least one sensor unit may determine the corresponding modulation amplitude from a received fault difference signal, which represents a control deviation between the actual variable and the setpoint variable of the signal quality of the sensor signal, and set it accordingly. The control loops may preferably be designed as proportional-integral-derivative (PID) control loops.

Specific embodiments of the present invention make a sensor system for a vehicle available, which includes at least one sensor unit and one evaluation and control unit. The evaluation and control unit transmits a synchronization signal via a communication connection to the at least one sensor unit, and the at least one sensor unit transmits a sensor signal representing the measured variable via the communication connection to the evaluation and control unit. According to the present invention, the evaluation and control unit ascertains an instantaneous signal quality of the received sensor signal and transmits a piece of information about the ascertained instantaneous signal quality to the at least one sensor unit, the at least one sensor unit setting a modulation amplitude for the transmission of the sensor signal as a function of the ascertained instantaneous signal quality.

Specific embodiments of the present invention further make an operating method available for a sensor system in a vehicle, having at least one sensor unit and one evaluation and control unit. For this purpose, a synchronization signal is transmitted from the evaluation and control unit via a communication connection to the at least one sensor unit, and a sensor signal representing the measured variable is transmitted from the at least one sensor unit via the communication connection to the evaluation and control unit. According to the present invention, an instantaneous signal quality of the received sensor signal is ascertained, and a piece of information about the ascertained instantaneous signal quality is transmitted to the at least one sensor unit, a modulation amplitude for the transmission of the sensor signal being predefined as a function of the ascertained instantaneous signal quality.

An evaluation and control unit may presently be understood to mean an electrical device, such as a control unit, for example, which processes or evaluates detected sensor signals. The evaluation and control unit may have at least one interface which may be designed as hardware and/or software. In the case of a hardware design, the interfaces may, for example, be part of a so-called system ASIC which includes a wide variety of functions of the evaluation and control unit. However, it is also possible for the interfaces to be separate integrated circuits, or to be at least partially composed of discrete components. In the case of a software design, the interfaces may be software modules which are present on a microcontroller, for example, in addition to other software modules. In addition, a computer program product is advantageous, having program code which is stored on a machine-readable carrier such as a semiconductor memory, a hard disk memory or an optical memory, and which is used to carry out the evaluation if the program is executed by the evaluation and control unit.

A sensor unit is presently understood to mean a subassembly which includes at least one sensor element, which directly or indirectly detects a physical variable or a change of a physical variable and preferably converts the same into an electrical sensor signal. The ascertained sensor signals are evaluated in the particular sensor unit and converted into sensor data, which include a physical variable which is ascertained from a physical variable detected with the particular sensor unit with the associated unit. For this purpose, the path change during a certain time window is ascertained, for example by a sensor element, and a speed and/or acceleration is/are calculated therefrom by the evaluation and control unit. Additional physical variables that may be calculated are mass, rotational speed, force, pressure, energy and/or other conceivable variables, such as an occurrence probability for a certain event. The ascertainment of the sensor signals may be carried out statically and/or dynamically. Moreover, the ascertainment of the sensor signals may be carried out continuously or one time.

It is particularly advantageous that the evaluation and control unit modulates the synchronization signal using the information about the ascertained instantaneous signal quality and transmits it to the at least one sensor unit. This allows an easy implementation of the present invention since a synchronization signal which is used anyhow is additionally used to transmit information about the instantaneous signal quality.

In one advantageous embodiment of the sensor system according to the present invention, the evaluation and control unit ascertains the modulation amplitude to be set from the ascertained instantaneous signal quality and from a predefined signal quality as information about the ascertained instantaneous signal quality and transmits the same to the at least one sensor system, which uses the received information about the ascertained instantaneous signal quality directly for setting the modulation amplitude. This means that the evaluation and control unit ascertains the value of the modulation amplitude to be set and transmits the same to the at least one sensor unit.

In one further advantageous embodiment of the sensor system according to the present invention, the evaluation and control unit determines a fault signal from the ascertained instantaneous signal quality and from a predefined signal quality as information about the ascertained instantaneous signal quality and transmits the fault signal to the at least one sensor signal. The at least one sensor unit then determines from the received fault signal the modulation amplitude for the sensor signal and sets the modulation amplitude.

In one further advantageous embodiment of the sensor system according to the present invention, the at least one sensor unit modulates the power consumption of the sensor signal for the transmission of the detected measured variable, whereby easy transmission of the measured variable to the evaluation and control unit is made possible.

In one advantageous embodiment of the operating method according to the present invention, the information about the ascertained instantaneous signal quality includes information about a failure rate and/or a signal to noise ratio.

In one further advantageous embodiment of the operating method according to the present invention, the synchronization signal is modulated using the information about the ascertained instantaneous signal quality and is transmitted to the at least one sensor unit.

In one further advantageous embodiment of the operating method according to the present invention, the modulation amplitude for the transmission of the sensor signal is ascertained by the evaluation and control unit or by the at least one sensor unit.

One exemplary embodiment of the present invention is shown in the drawings and is described in greater detail in the following description. In the drawings, identical reference numerals and symbols denote components or elements which carry out the same or similar functions.

BRIEF DESCRIPTION OF THE DRAWING

The FIGURE shows a schematic block diagram of one exemplary embodiment of a sensor system according to the present invention.

DETAILED DESCRIPTION OF THE INVENTION

As is apparent from the FIGURE, the shown exemplary embodiment of a sensor system 10 according to the present invention for a vehicle includes an evaluation and control unit 20 having a first transmitter unit 22 and a first receiver unit 24, and a sensor unit 30 having a second transmitter unit 32 and a second receiver unit 34. Evaluation and control unit 20 communicates with sensor unit 30 via a communication connection 12. Evaluation and control unit 20 transmits a synchronization signal $S_{AS}$ to the at least one sensor unit 30 via communication connection 12. In response to synchronization signal $S_{AS}$, the at least one sensor unit 30 transmits a sensor signal $S_{IM}$ representing the measured variable via communication connection 12 to evaluation and control unit 20.

According to the present invention, evaluation and control unit 20 ascertains an instantaneous signal quality $G_i$ of received sensor signal $S_{IM}$ and transmits a piece of information $M_A$, $\Delta M$ about the ascertained instantaneous signal quality $G_i$ to sensor unit 30. Sensor unit 30 sets a modulation amplitude $M_A$ for the transmission of sensor signal $S_{IM}$ as a function of the ascertained instantaneous signal quality $G_i$. Information $M_A$, $\Delta M$ about the ascertained instantaneous signal quality $G_i$ includes information about a failure rate and/or a signal to noise ratio, for example.

As a result of the variable adjustable modulation amplitude $M_A$ of sensor signal $S_{IM}$ to be transmitted, an interference power radiated by sensor unit 30 in the frequency band of the communication may be reduced since it is taken into consideration whether a smaller modulation amplitude $M_A$ would also have sufficed for reliable communication, for example in the case of a very large signal to noise ratio.

In the known communication standards, such as PSI5 v1.3 and v2.0, evaluation and control unit 20 may also establish a communication from evaluation and control unit 20 in the direction of sensor unit 30 with the aid of the modulation of synchronization signal $S_{AS}$, for example with the aid of an on/off modulation, a pulse width modulation and the like. Sensor unit 30 may then be informed about the instantaneous signal quality of the communication via this feedback channel. If the signal quality present is more than sufficient, in this way sensor unit 30 may then reduce modulation amplitude $M_A$ in order to reduce its noise radiation to the minimally necessary degree. The power consumption in evaluation and control unit 20 may thus also be minimized.

This means that evaluation and control unit 20 modulates synchronization signal $S_{AS}$ using information $M_A$, $\Delta M$ about the ascertained instantaneous signal quality $G_i$ via a modulator 22.1 which is situated in first transmitter unit 22, which transmits synchronization signal $S_{AS}$ modulated using information $M_A$, $\Delta M$ about the ascertained instantaneous signal quality $G_i$ to sensor unit 30. Sensor unit 30 receives synchronization signal $S_{AS}$ modulated using information $M_A$, $\Delta M$ about the ascertained instantaneous signal quality $G_i$ with second receiver unit 34. A demodulator 34.1 situated in second receiver unit 34 demodulates the received synchronization signal $S_{AS}$ and makes the ascertained information about the ascertained instantaneous signal quality $G_i$ available for evaluation.

In a first possible specific embodiment, evaluation and control unit 20 determines a fault signal $\Delta G$ from the ascertained instantaneous signal quality $G_i$ and from a predefined setpoint signal quality $G_S$ and transmits a corresponding level deviation $\Delta M$ as information about the ascertained instantaneous signal quality $G_i$ to sensor unit 30. Sensor unit 30 evaluates the received level deviation $\Delta M$ and ascertains modulation amplitude $M_A$ to be set. For the transmission of the measured variables, sensor unit 30 then accordingly sets the ascertained modulation amplitude $M_A$ of sensor signal $S_{IM}$. In addition, sensor unit 30 modulates the power consumption of sensor signal $S_{IM}$ using a modulator 32.1 situated in second transmitter unit 32 for the transmission of the detected measured variable.

In a second possible specific embodiment, evaluation and control unit 20 determines a fault signal $\Delta G$ from the ascertained instantaneous signal quality $G_i$ and from a predefined setpoint signal quality $G_S$. From the determined fault signal $\Delta G$, evaluation and control unit 20 calculates a corresponding value for modulation amplitude $M_A$ to be set and transmits the same as information about the ascertained instantaneous signal quality $G_i$ to sensor unit 30. Sensor unit 30 receives the value for modulation amplitude $M_A$ to be set and sets modulation amplitude $M_A$ of sensor signal $S_{IM}$ accordingly. Moreover, sensor unit 30 modulates the power consumption of sensor signal $S_{IM}$ using a modulator 32.1 situated in second transmitter unit 32 for the transmission of the detected measured variable.

Specific embodiments of the operating method according to the present invention for a sensor system in a vehicle having at least one sensor unit 30 and one evaluation and control unit 20 transmit a synchronization signal $S_{AS}$ from evaluation and control unit 20 via communication connection 12 to the at least one sensor unit 30. In addition, a sensor signal $S_{IM}$ representing the measured variable is transmitted from the at least one sensor unit 30 via communication connection 12 to evaluation and control unit 20. According to the present invention, an instantaneous signal quality $G_i$ of received sensor signal $S_{IM}$ is ascertained, and a piece of information about the ascertained instantaneous signal quality $G_i$ is transmitted to the at least one sensor unit 30, a modulation amplitude $M_A$ for the transmission of sensor signal $S_{IM}$ being predefined as a function of the ascertained instantaneous signal quality $G_i$. Synchronization signal $S_{AS}$ is preferably modulated using the information about the ascertained instantaneous signal quality $G_i$ and is transmitted to the at least one sensor unit 30. Moreover, evaluation and control unit 20 or the at least one sensor unit 30 ascertains modulation amplitude $M_A$ for the transmission of sensor signal $S_{IM}$.

Specific embodiments of the present invention make a sensor system available, which advantageously is implemented as a control loop. For this purpose, the modulation amplitude of the sensor signal is the controlled variable. A sufficient communication quality, such as a failure rate, for example, is the setpoint variable. If the actual failure rate is lower than the predefined setpoint variable, the transmitter unit receives a signal to reduce the modulation amplitude. If the actual failure rate is higher than the setpoint variable, the sensor unit receives a signal to increase the modulation amplitude. The corresponding controller is preferably designed as a PID controller and situated in the first transmitter unit of the evaluation and control unit or in the second receiver unit of the sensor unit. If it is positioned in the first transmitter unit, the modulation amplitude to be used is directly transmitted by modulation of the synchronization signal. If it is positioned in the second receiver unit, the control deviation is transmitted by modulation of the synchronization signal, the control deviation then being evaluated and processed by the sensor unit.

What is claimed is:

1. A sensor system for a vehicle, comprising:
    a sensor unit; and
    an evaluation and control unit to transmit a synchronization signal via a communication connection to the sensor unit;
    wherein the sensor unit transmits a sensor signal representing a measured variable via the communication connection to the evaluation and control unit, the evaluation and control unit ascertains an instantaneous signal quality of the received sensor signal and transmits an item of information about the ascertained instantaneous signal quality to the sensor unit via the communication connection, and the sensor unit modulates a subsequent transmission of the sensor signal at a modulation amplitude as a function of the ascertained instantaneous signal quality.

2. The sensor system as recited in claim 1, wherein the evaluation and control unit modulates the synchronization signal based on the information about the ascertained instantaneous signal quality and transmits the modulated synchronization signal to the sensor unit, and the sensor unit demodulates the synchronization signal to determine the information about the ascertained instantaneous signal quality.

3. The sensor system as recited in claim 1, wherein the evaluation and control unit ascertains the modulation amplitude to be set based on the ascertained instantaneous signal quality and a predefined signal quality, and transmits the modulation amplitude as the item of information about the ascertained instantaneous signal quality to the sensor unit.

4. The sensor system as recited in claim 1, wherein the evaluation and control unit determines an error signal based on the ascertained instantaneous signal quality and a predefined setpoint signal quality, and the evaluation and control unit transmits the determined error signal as the item of information about the ascertained instantaneous signal quality to the sensor unit.

5. The sensor system as recited in claim 4, wherein the sensor unit determines from the error signal the modulation amplitude to be set for the sensor signal.

6. The sensor system as recited in claim 3, wherein the sensor unit modulates the power consumption of the sensor signal for the subsequent transmission of the sensor signal.

7. A method for operating a sensor system in a vehicle having a sensor unit and an evaluation and control unit, the method comprising:
    transmitting a synchronization signal from the evaluation and control unit via a communication connection to the sensor unit;
    transmitting a sensor signal representing a measured variable from the sensor unit via the communication connection to the evaluation and control unit;
    ascertaining an instantaneous signal quality of the received sensor signal;
    transmitting an item of information about the ascertained instantaneous signal quality from the evaluation and control unit to the sensor unit via the communication connection; and
    modulating by the sensor unit a subsequent transmission of the sensor signal at a modulation amplitude as a function of the ascertained instantaneous signal quality.

8. The method as recited in claim 7, wherein the information about the ascertained instantaneous signal quality includes information about at least one of: a failure rate, or a signal to noise ratio.

9. The method as recited in claim 7, wherein the synchronization signal is modulated using the information about the ascertained instantaneous signal quality for transmission to the sensor unit.

10. The method as recited in claim 7, wherein the modulation amplitude for the transmission of the sensor signal is determined by at least one of: the evaluation and control unit, or the sensor unit.

11. The sensor system as recited in claim 1, wherein the sensor unit transmits the sensor signal representing the measured variable to the evaluation and control unit in response to receiving the synchronization signal.

12. The sensor system as recited in claim 1, wherein the instantaneous signal quality is a failure rate of transmission of the sensor signal.

13. The sensor system as recited in claim 1, wherein the instantaneous signal quality is a signal to noise ratio of the sensor signal.

14. The sensor system as recited in claim 1, wherein the sensor signal includes a quantity used to calculate an acceleration of the vehicle.

15. The sensor system as recited in claim 1, wherein the sensor signal includes a quantity used to calculate a rotation speed of the vehicle.

16. The sensor system as recited in claim 1, wherein the sensor signal includes a quantity used to calculate a pressure about the vehicle.

17. A sensor system for a vehicle, comprising:
a sensor unit configured to:
    receive a synchronization signal from an evaluation and control unit via a communication connection;
    transmit a sensor signal representing a measured variable to the evaluation and control unit via the communication connection in response to receiving the synchronization signal;
    receive an item of information about an instantaneous signal quality of the sensor signal from the evaluation and control unit via the communication connection; and
    modulate a subsequent transmission of the sensor signal at a modulation amplitude as a function of the instantaneous signal quality.

18. The sensor system as recited in claim 17, wherein the sensor unit is configured to demodulate the synchronization signal to determine the information about the ascertained instantaneous signal quality.

19. The sensor system as recited in claim 17, wherein the instantaneous signal quality includes at least one of: a failure rate of transmission of the sensor signal, or a signal to noise ratio of the sensor signal.

20. The sensor system as recited in claim 17, wherein the sensor signal includes a quantity used to calculate at least one of: an acceleration of the vehicle, a rotation speed of the vehicle, or a pressure about the vehicle.

21. The sensor system as recited in claim 1, wherein the sensor unit includes a transmitter unit and a receiver unit, the transmitter unit transmits the sensor signal representing the measured variable via the communication connection to the evaluation and control unit, the evaluation and control unit transmits the item of information about the ascertained instantaneous signal quality to the receiver unit via the communication connection, the receiver unit provides a signal representing the modulation amplitude to the transmitter unit as a function of the received item of information, and the transmitter unit modulates the subsequent transmission of the sensor signal via the communication connection to the evaluation and control unit at the modulation amplitude.

22. The sensor system as received in claim 1, wherein the sensor unit further includes a sensor element to detect a physical variable and produce the sensor signal based on the detected physical variable, the physical variable including at least one of: a speed of the vehicle, an acceleration of the vehicle, or a rotational speed of the vehicle.

* * * * *